W. H. HIGGASON.
HAY RAKE.
APPLICATION FILED MAY 24, 1912.
1,117,045.
Patented Nov. 10, 1914.
3 SHEETS—SHEET 1.
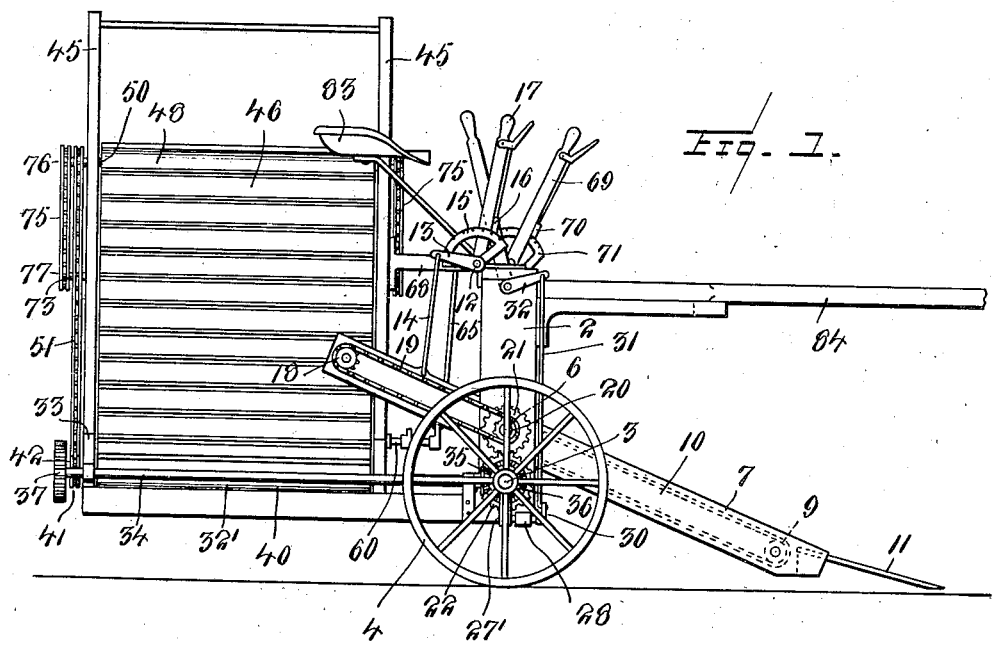
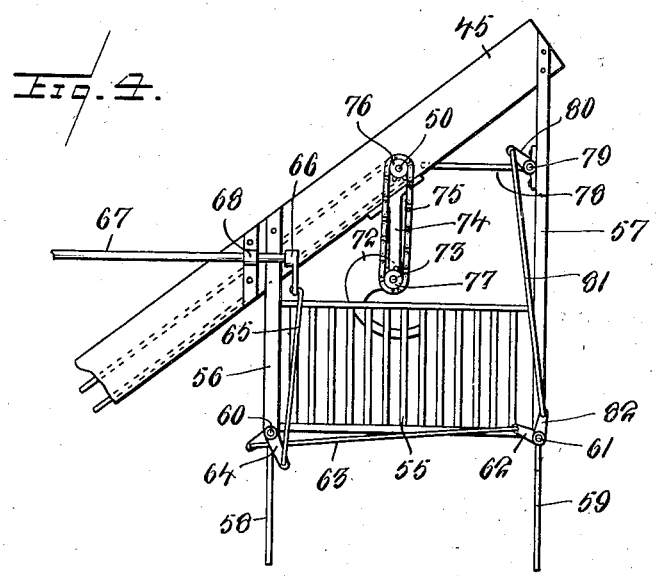
Witnesses
Inventor
William H. Higgason
By Victor J. Evans
Attorney

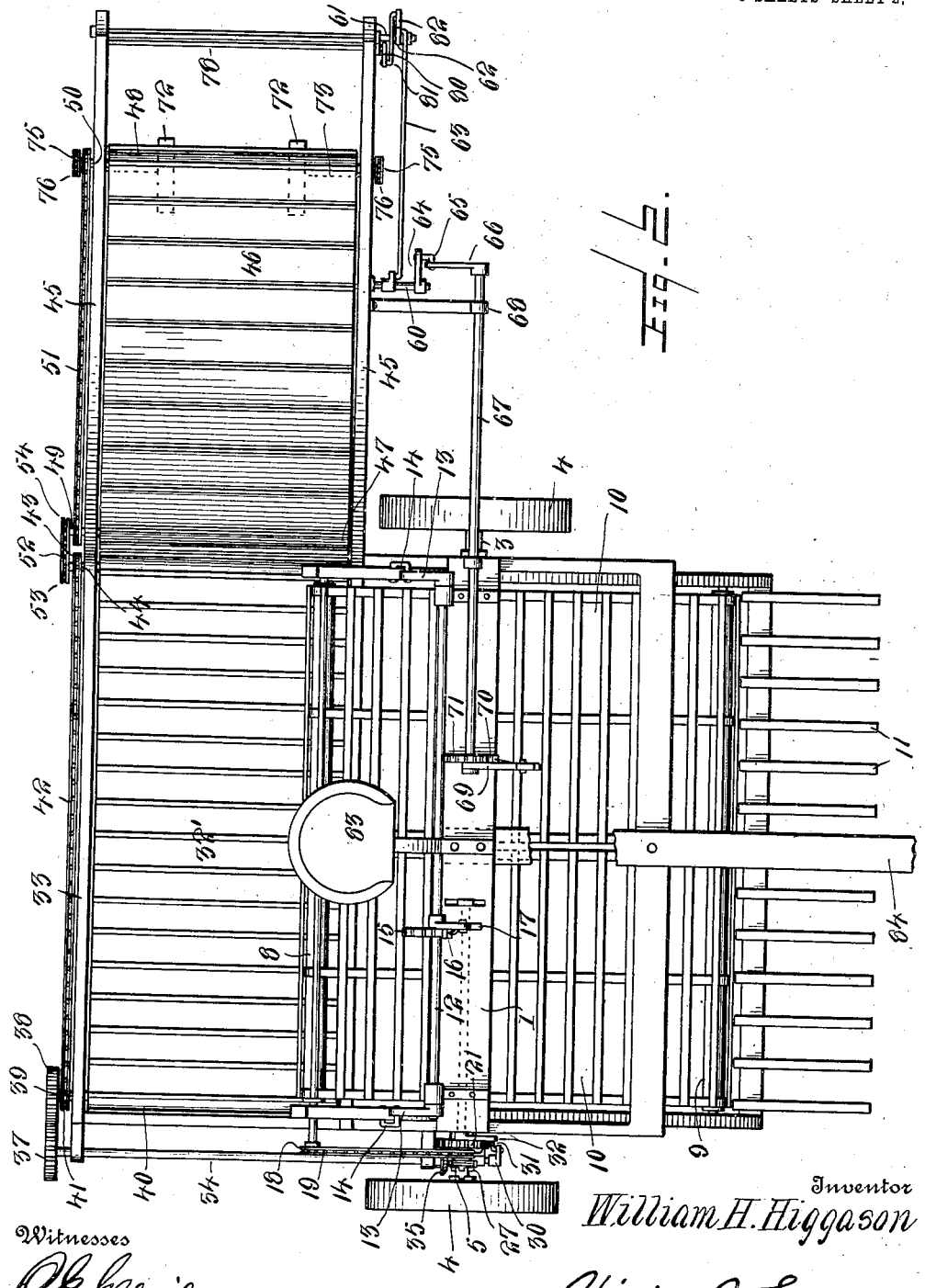

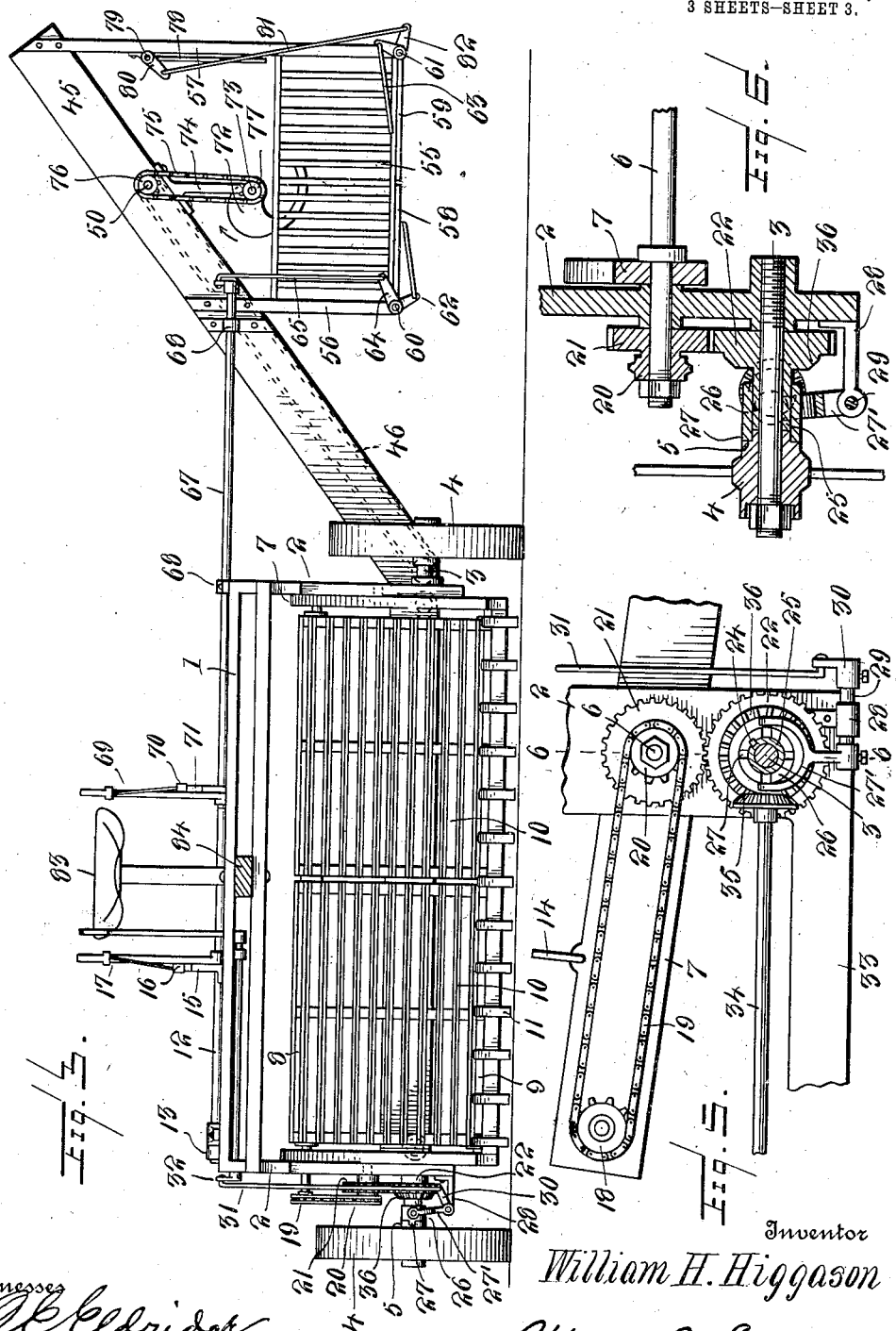

UNITED STATES PATENT OFFICE.

WILLIAM H. HIGGASON, OF TULARE, CALIFORNIA.

HAY-RAKE.

1,117,045.

Specification of Letters Patent. Patented Nov. 10, 1914.

Application filed May 24, 1912. Serial No. 689,476.

*To all whom it may concern:*

Be it known that I, WILLIAM H. HIGGASON, a citizen of the United States, residing at Tulare, in the county of Tulare and State of California, have invented new and useful Improvements in Hay-Rakes, of which the following is a specification.

This invention relates to a combined hay rake and bunch former and has for an object to provide an apparatus of this character which will include a collector which is designed to be propelled over the field and to collect the material and to convey the same as it is collected to the bunching receptacle.

Another object of the invention is to provide a collecting and bunching apparatus wherein means are employed to choke the delivery of the material from the conveyer during the discharge of the bunched material in the bunching receptacle to thereby eliminate the scattering of the material upon the field during the bunch dropping operation.

Another object of the invention is to provide collecting and bunching apparatus wherein the main collector is adjustable and provided with yieldable tines or collecting members whose adjustment against the ground can be readily effected as the occasion may demand so as to cause the positive collection of the material as the machine is advanced over the field.

Another object of the invention is to provide a plurality of movable tampers which are adapted to operate in the bunch forming receptacle and to be controlled by the material feeding mechanism and operable to thoroughly compress the material in the forming receptacle whereby a substantial or maximum quantity of material can be stored in the forming receptacle and arranged therein so as to prevent the accidental choking or congestion of the material at the discharge end of the feeder.

In the drawing forming a portion of this application and in which like letters of reference indicate similar parts in the several views:—Figure 1 is a side view of the apparatus. Fig. 2 is a top plan view thereof. Fig. 3 is a front view of the apparatus. Fig. 4 is a front view of the bunching receptacle showing the doors thereof open to permit the discharge of the bunch and further illustrating the automatic adjustment of the choking means to prevent the material from dropping toward the bunching receptacle from the feeder. Fig. 5 is a side view of the main feeder showing parts in section. Fig. 6 is a section on line 6—6 of Fig. 5.

In carrying the invention into practice I provide a frame 1 having depending sides 2 in which the stub shafts 3 are mounted. Each of these shafts has mounted thereon a tractor wheel 4, and as illustrated one of the wheels has its hub provided with a clutch surface 5. The frame 1 also supports a shaft 6 to which the carrier frame 7 is connected for rocking or pivotal movements. The carrier frame has revolubly mounted therein an upper roller 8 and a lower roller 9 and passing over these rollers are collecting belts 10. The forward end of the frame 7 has secured thereto a plurality of tines 11 which are constructed of yieldable metal so that their pressure against the ground can be regulated on adjustment of the frame 7. The frame 2 has mounted thereon a rocking controlling shaft 12 from which extend crank arms 13 which are connected by the links 14 to the sides of the carrier frame 7. A rack segment 15 on the frame 2 is designed for locking engagement with the keeper or dog 16 on the actuating lever 17. This lever is secured to the shaft 12 and it may be actuated manually to effect the desired adjustments of the frame 7 so as to vary the pressure of the tines 11 against the ground as the occasion may demand.

At one end, the roller 8 has secured thereto a sprocket gear wheel 18 which is connected by the driving chain 19 with the sprocket gear wheel 20 on the shaft 6. This sprocket gear wheel is formed as an integral part of the driven gear wheel 21, the latter being in mesh with a similar gear wheel 22 on the stub shaft 3 at the left of the machine. Splined as at 24 to the sleeve 25 of the driving gear wheel 22 is a clutch element 26 whose surface 27 is adapted for interfitting engagement with the surface 5 so as to cause the gear wheel 22 to revolve on the operative association of the clutch elements as will be understood. The sleeve 26 is supported by the rocking yoke 27', the latter being supported at 28 upon one of the side members 2 of the frame 1 and preferably mounted upon the shaft 29 in said bracket 28. This shaft has secured thereto a crank arm 30 which is connected by the controlling rod 31 with the actuating lever 32. The lever 32 is supported upon the frame 1 and it may be readily controlled when it is desired to throw the clutch elements into or out of gear.

A second carrier or conveyer 32' is mounted upon the platform or frame 33 of the machine as illustrated, the roller driving shaft 34 of this carrier has its forward end provided with a beveled gear wheel 35 which is arranged in intermeshing engagement with the annular beveled gear 36 on the driving gear wheel 22. The opposite end of the shaft 34 has secured thereto a driving gear wheel 37 which meshes with the driven gear wheel 38 on the shaft 39 of the roller 40 of the said second carrier 32'. A sprocket gear wheel 41 on the shaft 39 is connected by the driving chain 42 with the sprocket gear wheel 43 on the shaft 44 of the other roller of the second carrier 32'.

The frame 33 is provided with the angularly disposed extensions 45 in which a third carrier 46 is journaled. This carrier includes the companion rollers 47 and 48 whose shafts 49 and 50 are geared together by the driving chain 51. This chain is adapted to receive its power through the medium of the driving chain 52 which connects the sprocket 53 on the shaft 44 with the sprocket 54 on the shaft 49.

The bunch forming mechanism comprises a receptacle 55 which is supported from the members 45 by the brackets 56 and 57 and disposed below the plane of material discharge of the carrier 46. The bottom of the receptacle 55 is adapted to be closed in the bunching of the material by the doors 58 and 59, the former being mounted upon the shaft 60 in the bracket 56 and the latter upon the shaft 61 in the bracket 57. Crank arms 62 upon the shafts 60 and 61 are connected together by the oscillating link 63 whereby the doors of the receptacle will be simultaneously opened or closed as desired. On the shaft 60 is a crank arm 64 which is connected by the rod 65 to the crank arm 66 on the actuating shaft 67. This shaft is journaled in suitable brackets 68 upon the machine and it is equipped with the operating lever 69 and the pawl 70, the latter being adapted to engage with the rack segment 71 upon the frame 1 of the machine.

Tampers 72 are revolubly mounted upon the shaft 73. These tampers are substantially of cam configuration and they are adapted to revolve in the direction of the arrows shown in Fig. 3 whereby as the material enters the receptacle 55 it will be thoroughly compressed. The shaft 73 is mounted in brackets 74 which depend from the extensions 45 and as illustrated the shaft is driven through the medium of the driving chains 75 which connect the sprockets 76 on the shaft 50 with the sprockets 77 on the shaft 73. From this construction it is seen that all of the carriers and the tampers are driven from a common source. A cut-off or choking gate 78 is supported upon the rock shaft 79 in the bracket 57. When the gates of the bunching receptacle are closed the gate 78 is vertically disposed as shown in Fig. 3 of the drawings so as to not act as an obstruction to the material as it is discharged to the bunching receptacle. A crank arm 80 of the shaft 79 is connected by the rod 81 to the crank arm 82 on the shaft 61 whereby when the gates 58 and 59 are opened as shown in Fig. 4 the choking gate 78 will be adjusted to the position shown in Fig. 4 to prevent the material from being thrown into the bunching receptacle during the operation of discharging the formed bunch of material.

In close proximity to the controlling levers previously described and preferably mounted upon the frame 1 is the drivers' seat 83 and also secured to the frame 1 is a draft pole 84.

What I claim as new, is:—

1. The combination with an elevator, a receptacle suspended from the discharge end of the elevator, of spaced parallel brackets secured to the bottom longitudinal edges of the elevator and extending therefrom in the direction of the receptacle, a shaft journaled on the brackets, a tamper carried by the shaft, and means for driving the shaft.

2. A bunch former including a support, a receptacle, means secured to the outer faces of the support for suspending said receptacle, brackets secured to the bottom longitudinal edges of the support at a point between said suspending means, a shaft journaled on the brackets, another shaft arranged parallel with the former mentioned shaft and journaled on the support, a sprocket carried by the terminal of each shaft, a tamper carried by the former mentioned shaft, and a connection between the sprockets of each of said shafts for imparting movement to said tamper.

3. A bunch former including a support, a receptacle suspended from the support, spaced parallel brackets secured to the bottom longitudinal edges of the support, a shaft journaled on the brackets, another shaft journaled on the support, a tamper carried by the former mentioned shaft, and means connecting the former mentioned shaft with the latter mentioned shaft for imparting movement to said tamper.

4. A bunch former including a support, a receptacle suspended from the support, a pair of spaced parallel brackets secured to the bottom longitudinal edges of the support, a shaft journaled on the brackets, another shaft journaled on the support, a tamper carried by the former mentioned shaft, and means connecting the former mentioned shaft with the latter mentioned shaft for imparting a rotary movement to said tamper.

5. A bunch former including a support, a receptacle suspended from the free end of said support, a pair of spaced parallel brackets secured to and depending from the bottom surfaces of the support at a point adjacent its outer end, a shaft journaled on the brackets, another shaft journaled on the support, a tamper carried by the former mentioned shaft with the latter mentioned shaft for imparting movement to said tamper.

In testimony whereof I affix my signature in presence of two witnesses.

WILLIAM H. HIGGASON.

Witnesses:
FRED C. McALLISTER,
CALVIN RUSSELL, Jr.